US009604881B2

(12) United States Patent
Ono et al.

(10) Patent No.: US 9,604,881 B2
(45) Date of Patent: Mar. 28, 2017

(54) WEAR-RESISTANT MATERIAL, PUFFER CYLINDER, AND PUFFER-TYPE GAS CIRCUIT BREAKER

(71) Applicant: HITACHI, LTD., Tokyo (JP)

(72) Inventors: Masahiko Ono, Tokyo (JP); Makoto Hirose, Tokyo (JP); Daisuke Ebisawa, Tokyo (JP); Hisashi Urasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 14/306,483

(22) Filed: Jun. 17, 2014

(65) Prior Publication Data

US 2014/0367360 A1 Dec. 18, 2014

(30) Foreign Application Priority Data

Jun. 18, 2013 (JP) ................. 2013-127200

(51) Int. Cl.
*H01H 33/88* (2006.01)
*C04B 35/10* (2006.01)
*H01H 33/53* (2006.01)
*H01H 1/02* (2006.01)
*C23C 22/68* (2006.01)

(52) U.S. Cl.
CPC .............. *C04B 35/10* (2013.01); *C23C 22/68* (2013.01); *H01H 1/0203* (2013.01);
(Continued)

(58) Field of Classification Search
CPC ........ H01H 33/88; H01H 33/53; H01H 33/91; H01H 11/00; H01H 2011/0075;
(Continued)

(56) References Cited

U.S. PATENT DOCUMENTS 3,813,506 A * 5/1974 Mitchell ............. H01H 33/666
218/10
4,027,125 A * 5/1977 Peek ........................ H01H 3/30
200/308
(Continued)

FOREIGN PATENT DOCUMENTS

JP 63-184223 A 7/1988
JP 11-162305 A 6/1999
(Continued)

OTHER PUBLICATIONS

Japanese Office Action received in corresponding Japanese Application No. 2013-127200 dated Sep. 20, 2016.
(Continued)

*Primary Examiner* — Truc Nguyen
(74) *Attorney, Agent, or Firm* — Mattingly & Malur, PC

(57) ABSTRACT

The present invention includes a wear-resistant material including: a base material formed of pure aluminum or an aluminum alloy having a finely asperity structure on a surface thereof; and a coat including a hydrated oxide coat of aluminum, the coat being formed on the surface of the base material. Further, the present invention including a puffer cylinder including: a finely asperity structure on an inner-wall surface thereof; and a coat including a hydrated oxide coat of aluminum, the coat being formed on the inner-wall surface of the puffer cylinder. The present invention also includes a puffer-type gas circuit breaker includes the above puffer cylinder.

17 Claims, 3 Drawing Sheets

(52) U.S. Cl.
CPC .......... *H01H 33/53* (2013.01); *H01H 33/88* (2013.01); *C04B 2235/963* (2013.01); *H01H 2001/0205* (2013.01); *H01H 2033/888* (2013.01); *Y10T 428/24355* (2015.01)

(58) Field of Classification Search
CPC ..... H01H 2085/0291; H01H 2223/008; H01H 33/66; H01H 37/04; H01H 37/12; H01H 37/20; H01H 37/26; H01H 37/52; H01H 37/54; H01H 37/5418; H01H 37/5427; H01H 47/223; C23C 22/68
USPC ...... 218/57–61; 429/520, 522, 526; 428/624
See application file for complete search history.

(56) References Cited

U.S. PATENT DOCUMENTS

| | | | | |
|---|---|---|---|---|
| 4,550,234 | A | * | 10/1985 | Steinemer ............ H01H 33/666 200/502 |
| 2007/0221626 | A1 | | 9/2007 | Uchii |
| 2009/0311577 | A1 | * | 12/2009 | Washima ............... C25D 11/18 429/523 |
| 2015/0027985 | A1 | * | 1/2015 | Yanagi ................... H01H 33/64 218/46 |
| 2015/0060408 | A1 | | 3/2015 | Ono et al. |

FOREIGN PATENT DOCUMENTS

| JP | 2007-100201 A | 4/2007 |
|---|---|---|
| JP | 2007-258137 A | 10/2007 |
| JP | 2008-277014 A | 11/2008 |
| JP | 2015-48489 A | 3/2015 |

OTHER PUBLICATIONS

Chinese Office Action received in corresponding Chinese Application No. 201410268432.0 dated Dec. 5, 2016.
Liao Jing Yu et al., "Structure and Physical Properties of Surface Coating layer", Chemical Industry Publishing House, Beijing, www.cip.com.cn, Apr. 30, 2012 pp. 146-151.

* cited by examiner

WEAR-RESISTANT MATERIAL, PUFFER CYLINDER, AND PUFFER-TYPE GAS CIRCUIT BREAKER

CLAIM OF PRIORITY

The present application claims priority from Japanese patent application serial no. 2013-127200 filed on Jun. 18, 2013, the content of which is hereby incorporated by reference into this application.

BACKGROUND OF THE INVENTION

1. Field of the Invention

The invention relates to a wear-resistant material, a puffer cylinder, and a puffer-type gas circuit breaker, and in particular, to a wear-resistant material, a puffer cylinder, and a puffer-type gas circuit breaker, suitable for use in each one formed of pure aluminum or an aluminum alloy.

2. Description of the Related Art

In general, a puffer-type gas circuit breaker for electric power includes a stationary contactor, a movable contactor which is arranged capable of contacting with and separating from a stationary-side arc-contactor, a puffer cylinder linked with the movable contactor, a piston making a relative movement against the inner-wall surface of the puffer cylinder, a puffer chamber having a suction hole for sucking in the arc-extinguishable gas and a blast nozzle for spurting the same in the direction of the contactor, and a wearing on the outer periphery of the piston, slidably moving against the inner-wall surface of the puffer cylinder in a vessel filled up with an arc-extinguishable gas. The puffer-type gas circuit breaker is configured such that the arc-extinguishable gas spurted from the blast nozzle is sprayed to an arc which is generated by the separation of the stationary contactor and the movable contactor, and thereby the arc is extinguished.

With the puffer-type gas circuit breaker made up as above, an aluminum alloy is often used in the puffer cylinder for the purpose of reduction in weight. However, aluminum is easy to wear. Thus, various surface treatments are applied thereto in order to prevent the wear of a slidably-movable part.

In general, application of an alumite treatment, a plating treatment, or a variety of coatings are known in order to enhance the wear-resistance of an aluminum alloy.

There is, for example, a technique described in Patent Document 1 (JP-A-63-184223), as a technique for enhancement of the wear-resistance of an aluminum alloy. In this Patent Document 1, it is described that a puffer cylinder, an operation rod, and a presser plate are each formed of aluminum or an aluminum alloy, and an aluminum oxide coat formed by the alumite treatment is provided on respective portions of these components, coming in contact with each other.

Further, in Patent Document 2 (JP-A-2008-277014), it is described that a coating layer of an amorphous carbon or a diamond-like carbon, for use as material that is wear-resistant and low in frictional properties, is formed on a slidable surface of a seal-member made up of a synthetic rubber or fluororesin, for slidably supporting a seal-rod at a penetration part of a gas vessel, slidably moving against the seal rod, to thereby prevent an arc-extinguishable gas in the gas vessel from flowing out towards a manipulation-mechanism.

Still further, in Patent Document 3 (JP-A-2007-258137), it is described that a silicone grease having lubricity is applied to the outer peripheral surface of a cylinder slidably moving at a time when a stationary arc-contactor comes in contact with, or parts from a movable arc-contactor in order to reduce friction.

However, with the technique disclosed in Patent Document 1 described as above, the alumite treatment is applied to the respective portions of the puffer cylinder, the operation rod, and the presser plate, coming in contact with each other, and although an alumite coat formed by the alumite treatment is excellent in corrosion resistance and wear resistance, anodic oxidation is required in the alumite treatment, so that the cost of electric power required by facilities will increase, and in the case of using sulfuric acid, facilities for waste-water treatment will be required, thereby posing a cost problem.

Further, with the technique disclosed in Patent Document 2, the wear-resistance of a slidably-movable member is enhanced by coating with the material low in frictional properties such as the amorphous carbon or the diamond-like carbon, etc., however, these being the coating formed by the high-frequency plasma CVD (Chemical Vapor Deposition) method, if the method is to be applied to a puffer cylinder, a vacuum apparatus having a capacity capable of processing the puffer cylinder will be required.

Still Further, with the technique disclosed in Patent Document 3, because the silicone grease having lubricity is applied to the outer peripheral surface of the cylinder, serving as the slidably-movable part, there is the need for taking degradation of the silicone grease into consideration if the silicone grease is in use for a long time-period, thereby necessitating periodical maintenance.

The present invention has been developed in view of those points described as above, and it is therefore an object of the invention to provide a wear-resistant material, a puffer cylinder, and a puffer-type gas circuit breaker, available at a low cost, and excellent in wear-resistance.

SUMMARY OF THE INVENTION

To that end, according to one aspect of the present invention, there is provided a wear-resistant material including:

a base material formed of pure aluminum or an aluminum alloy having a finely asperity structure on a surface thereof; and a coat including a hydrated oxide coat of aluminum, the coat being formed on the surface of the base material.

To that end, according to another aspect of the present invention, there is provided a puffer cylinder formed of pure aluminum or an aluminum alloy being linked with a movable-side arc-contactor which is arranged capable of contacting with and separating from a stationary-side arc-contactor, fitted with a piston inside thereof, and the piston slidably moving against the inner-wall surface of the puffer cylinder in order for the piston to suck in, or spurt an arc-extinguishable gas, the puffer cylinder including: a finely asperity structure on an inner-wall surface thereof; and a coat including a hydrated oxide coat of aluminum, the coat being formed on the surface of the puffer cylinder.

To that end, according to still another aspect of the present invention, there is provided a puffer-type gas circuit breaker including: a stationary-side arc-contactor; a movable-side arc-contactor being arranged capable of contacting with and separating from the stationary-side arc-contactor; a puffer cylinder formed of pure aluminum or an aluminum alloy being linked with the movable-side arc-contactor; a piston for sucking in or spurting the arc-extinguishable gas while making a relative movement against the inner-wall surface of the puffer cylinder; and the puffer-type gas circuit breaker being configured such that the arc-extinguishable gas that is spurted as a result of the movement made by the piston is sprayed to an arc caused by the separation of the stationary contactor and the movable contactor to thereby extinguish the arc, wherein the puffer cylinder is the puffer cylinder described above.

The invention has advantageous effects in that a cost can be lowered and excellent wear-resistance can be achieved, while suppressing the generation of the abrasion-powders of aluminum.

DETAILED DESCRIPTION OF THE PREFERRED EMBODIMENTS

A wear-resistant material, a puffer cylinder, and a puffer-type gas circuit breaker, according to the invention, are described below on the basis of respective embodiments shown in the accompanying drawings.

First Embodiment

Figure 1:
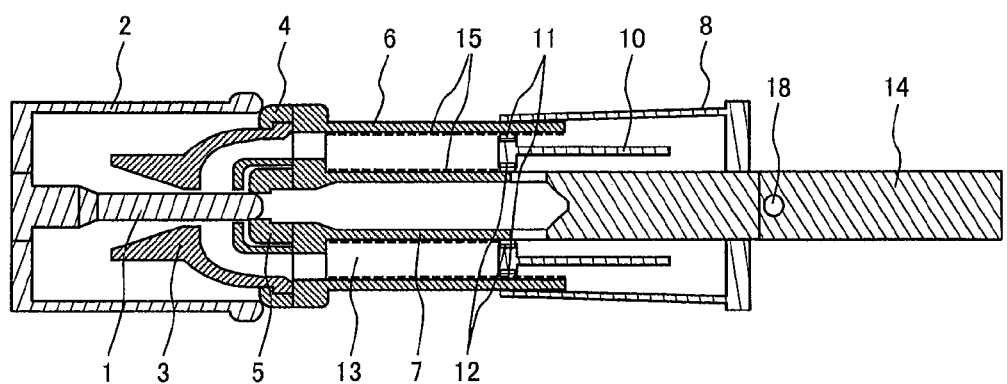
FIG. 1 is a schematic cross-sectional view of a first embodiment of a puffer-type gas circuit breaker according to the invention, indicating a current-ON state.

FIG. 1 is a schematic cross-sectional view of a first embodiment of a puffer-type gas circuit breaker according to the invention, indicating a current-ON state.

With the puffer-type gas circuit breaker according to the present embodiment, a stationary-side current-carrying unit is made up of a stationary-side arc-contactor 1, and a stationary-side main contactor 2 disposed outside the stationary-side arc-contactor 1, whereas a movable-side current-carrying unit in contact with the stationary-side current-carrying unit is made up of a movable-side arc-contactor 5, and a movable-side main contactor 4 disposed outside the movable-side arc-contactor 5, as shown in FIG. 1, both the stationary-side current-carrying unit, and the movable-side current-carrying unit being fixed to a puffer cylinder 6.

A cylinder shaft 7 is installed at a central part of the puffer cylinder 6, the cylinder shaft 7 is connected to an insulation-manipulation rod 14 via a link 18, and an operation for causing the current-ON state between the stationary-side current-carrying part and the movable-side current-carrying part, or a current cut-off state therebetween is executed by driving the insulation-manipulation rod 14 through a manipulator (not shown). Further, an external current collector 8 is disposed on the outer periphery of the puffer cylinder 6, and the external current collector 8 is connected to a movable-side main circuit conductor (not shown) supported by an insulating tube (not shown).

Meanwhile, a piston 10 is fitted into the puffer cylinder 6, and there is formed a puffer chamber 13 surrounded by an inner surface of the puffer cylinder 6, an outer surface of the cylinder shaft 7, and the piston 10, for the purpose of compressing an arc-extinguishable gas. The puffer cylinder 6 is made of pure-aluminum or an aluminum alloy, and the piston 10 is made of a metal such as pure-aluminum or an aluminum alloy, or iron, etc. With the present embodiment, the piston 10 is made of an aluminum alloy. Respective wearings 11, and 12, differing in diameter from each other, are provided on the outer periphery of the piston 10, and following a movement made by the piston 10, the piston 10 slidably moves against an inner surface of the puffer cylinder 6, while slidably moving against an inner surface of the cylinder shaft 7, through the intermediary of the respective wearings 11, and 12.

Figure 2:
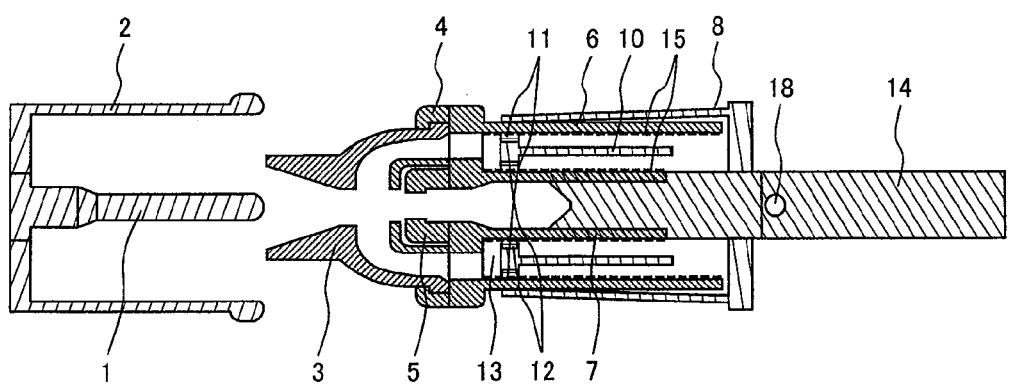
FIG. 2 is a schematic cross-sectional view of the first embodiment of the puffer-type gas circuit breaker according to the invention, indicating a current cut-off state.

FIG. 2 indicates a state of the puffer-type gas circuit breaker, at a time when a current cut-off operation is executed from the current-ON state shown in FIG. 1. At the time of the current cut-off operation, the puffer cylinder 6 moves rightward in FIG. 2, and as a result, the stationary-side arc-contactor 1 is separated from the movable-side arc-contactor 5, and the piston 10 is caused to move so as to compress the puffer chamber 13 such that the volume of the puffer chamber 13 is reduced, whereupon the arc-extinguishable gas from an insulation nozzle 3 is sprayed to an arc generated between the stationary-side arc-contactor 1 and the movable-side arc-contactor 5, so that the arc is extinguished.

With the puffer-type gas circuit breaker according to the present embodiment, made up as above, there was applied for forming hydrated aluminum in a range (indicated by reference sign 15 in FIGS. 1 and 2) wider than respective portions of the puffer cylinder 6, against which the respective wearings 11, and 12 slidably move.

Figure 4:
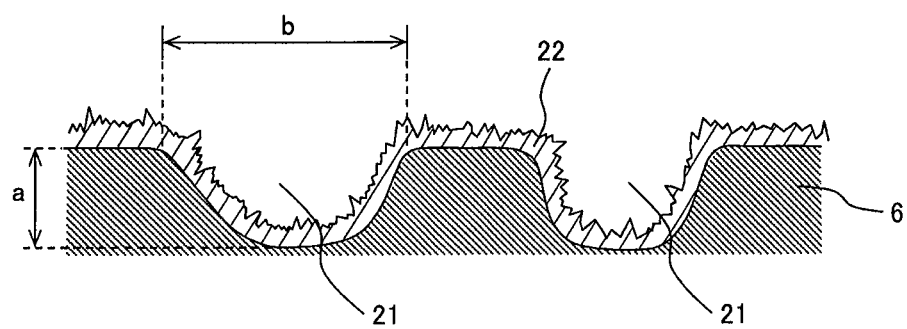
FIG. 4 is a schematic view showing an example of the inner-wall surface of a puffer cylinder, in sectional shape, in the case of the first embodiment of the puffer-type gas circuit breaker according to the invention.
Figure 5:
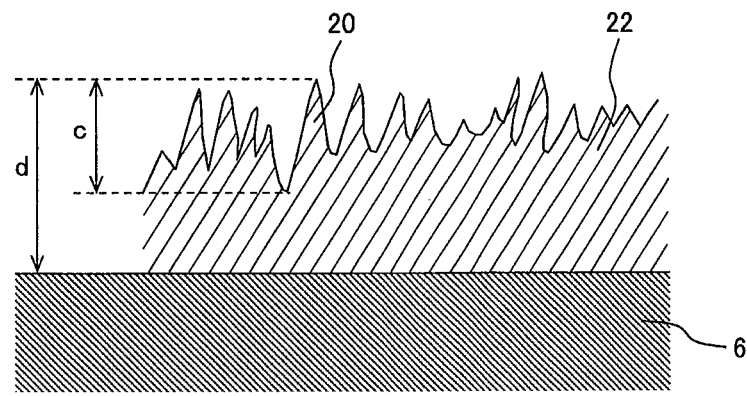
FIG. 5 is a schematic view showing the inner-wall surface of a puffer cylinder, in sectional shape, in the case of the first embodiment of the puffer-type gas circuit breaker according to the invention.

As a treatment for forming the hydrated aluminum, the puffer cylinder 6 subjected to degreasing after machining was immersed in pure water heated to 95° C. or higher for predetermined time. By optimization of the above treatment time, a finely asperity structure was formed on the surface of the puffer cylinder 6 as shown in FIGS. 4 and 5. The surface of the puffer cylinder 6 formed of an aluminum alloy has a depression 21. The depth of the depression 21 (the length of "a" described in FIG. 4) is not less than 1 μm, preferably about 5 μm, in a pit-like shape or a crater-like shape. The diameter of the depression 21 (the length of "b" described in FIG. 4) is about from 5 to 30 μm. The depression 21 sometimes forms an aggregates and the diameter of the aggregates is about from 80 to 100 μm.

As described in FIG. 4, a hydrated oxide coat of aluminum 22 was formed along the projections and depressions of the puffer cylinder 6. The hydrated oxide coat of aluminum 22 has a fine projection 20. The length of the projection 20 (the length of "c" described in FIG. 5) is not more than 1 μm, in a needle-like shape or a petal-like shape. The range of the thickness of the coat (the length of "d" described in FIG. 5) is preferably 1 to 3 μm. The thickness can be controlled by the treatment time.

According to an analysis of an X-ray diffractometer of the surface of the puffer cylinder 6, it was found that boehmite ($Al_2O_3 \cdot H_2O$) and bayerite ($Al(OH)_3$) were formed. A skewness SK of the surface of the puffer cylinder 6 was −1.2, and a reduced valley depth Rvk of the surface of the puffer cylinder 6 was 3.6 μm. The skewness SK is a parameter based on the JIS (Japanese Industrial Standards) B 0601: 1994 (which corresponds Rsk based on the JIS B 0601: 2013) and ISO (International Organization for Standardization) 4287:1997. The reduced valley depth Rvk is a parameter based on the JIS 0671-2:2002 and ISO 13565-2: 1996.

If the skewness SK is a positive value, this indicates that the surface is rough, thereby rendering an opposite material (wearing 11 and 12) susceptible to wear. Thus, it is preferred that the skewness SK is a negative value because the wearing amount of opposite material can be reduced. If the reduced valley depth Rvk is less than 1 μm, transfer of the opposite material is small. It is preferred that the reduced valley depth Rvk is 1 μm or more because a piece of the opposite material generated by wearing the opposite material is retained at the depression 21 and a friction between the puffer cylinder 6 and the opposite material approaches a friction between the opposite material.

The above treatment liquid is not limited to pure water. The treatment liquid may contain additives, such as carbonate, oxalate, triethanolamine, hydrazine or solute of seawater. Further, the treatment water may contain mixture of magnesium ion and hydrogen carbonate ion, mixture of magnesium ion, hydrogen carbonate ion and sulfide ion, mixture of hydroxide ion and lithium ion, mixture of hydroxide ion and sodium ion (sodium hydroxide), mixture of hydroxide ion and potassium ion (potassium hydroxide), mixture of hydroxide ion and calcium ion, hydroxide ion, mixture of lithium ion and nitrate ion, mixture of hydroxide or sulfate, for example.

The structure of the base material (puffer cylinder 6) having the coat obtained by a chemical conversion coating of the present invention differs from the structure of an alumite obtained by an anodic oxidation. Each of the depression 21 and the coat 22 have a finely asperity structure. The respective depressions (crater) 21 have various sizes and are formed randomly on the base material in the present invention. In contrast, in the case of the alumite, micropores in a cylindrical shape are generally formed regularly on the surface thereof.

With the present embodiment described as above, a finely asperity structure is formed on the puffer cylinder 6 formed of aluminum or an aluminum alloy. This will promote transfer of a wearing material, to thereby enable abrasion-powders of aluminum to be suppressed, so that wear resistance is enhanced. Further, a facility cost of the present invention can be lower than that of the alumite.

Second Embodiment

Figure 3:
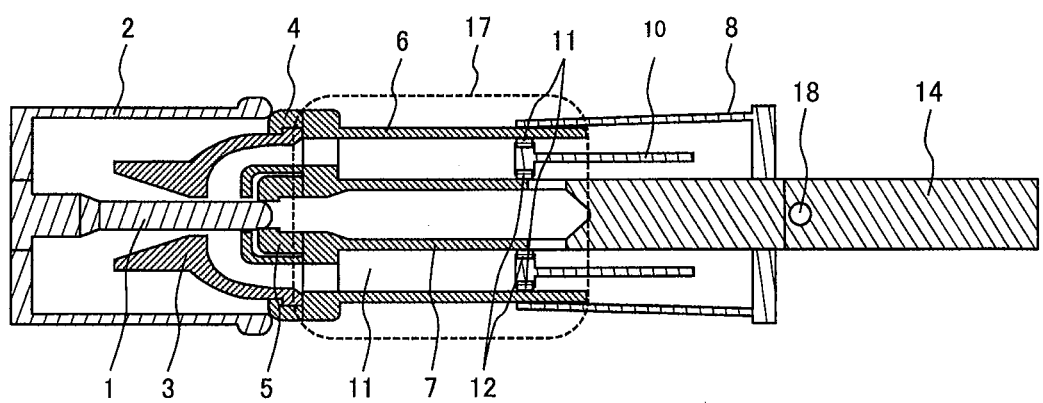
FIG. 3 is a schematic cross-sectional view corresponding to FIG. 1, showing a range where processing for hydrated aluminum is executed in the case of a second embodiment of a puffer-type gas circuit breaker according to the invention.

FIG. 3 is a view showing a second embodiment of a puffer-type gas circuit breaker according to the invention. With the present embodiment shown in FIG. 3, hydrated aluminum is formed throughout the whole 17 of a puffer cylinder 6 (that is, the hydrated aluminum coat is formed on the outer surface of the puffer cylinder 6 as well as the inner surface thereof). A treatment condition is the same as that in the case of the first embodiment.

With the present embodiment described as above, the same advantageous effects as those in the case of the first embodiment can be obtained.

Third Embodiment

With the present embodiment, hydrated aluminum is formed on a puffer cylinder 6 by use of an aqueous solution obtained by addition of a small amount of ammonia to the pure water used in the first embodiment.

With the present embodiment described as above, needless to say, not only the same advantageous effects as those in the case of the first embodiment can be obtained but also a time length for immersion of the puffer cylinder 6 in an aqueous solution heated to 95° C. or higher can be shortened if use is made of the aqueous solution according to the present embodiment.

Further, with the present embodiment, ammonia is used, however, besides ammonia, amine, and a liquid or a solid, alkalifying an aqueous solution may be used.

Fourth Embodiment

With the present embodiment, treatment for forming hydrated aluminum on a puffer cylinder 6 is carried out, as with the case of the first embodiment, except that treatment time is longer than that in the case of the first embodiment. In the case of this embodiment, the skewness SK was at −0.3, and the reduced valley depth Rvk was 2.7 μm. It was found that boehmite and bayerite were formed, as with the case of the first embodiment.

With the present embodiment described as above, the same advantageous effects as those in the case of the first embodiment can be obtained.

Comparative Example 1

An example in which the treatment time is shorter than that in the first embodiment is referred to as Comparative Example 1. In this case, the skewness SK was at −0.9, and the reduced valley depth Rvk was 0.9 μm.

Comparative Example 2

As Comparative Example 2, an untreated aluminum alloy (which do not have a hydrated oxide coat of aluminum) was used.

In this case, the skewness SK was at −0.03, and the reduced valley depth Rvk was 0.2 μm.

The embodiments 1 through 4, and Comparative Examples 1, 2 were each assembled in a gas circuit breaker to thereby conduct a slidable-movement test. The primary constituent of the opposing material was PTFE (PolyTetraFluoroEthylene), and use was made of a wearing that does not contain filler such as glass, etc. The results of the slidable-movement test are shown in following Table 1.

TABLE 1

|  | Wear resistance | |
| --- | --- | --- |
|  | Puffer cylinder | Wearing |
| First Embodiment | wear extremely small | wear extremely small |
| Second Embodiment | wear extremely small | wear extremely small |
| Third Embodiment | wear extremely small | wear extremely small |
| Fourth Embodiment | wear extremely small | slightly worn |
| Comparative Example 1 | Worn | Worn |
| Comparative Example 2 | Worn | Worn |

As is evident from Table 1, with the first through third embodiments, abnormal wear was not observed with respect to both the puffer cylinder 6, and the wearings 11, and 12.

With respect to the fourth embodiment, abnormal wear was not found on the puffer cylinder 6, however, the respective wearings 11 and 12 were found slightly worn, as compared with the first embodiment. This is due to deterioration in smoothness of the surface as compared with the first embodiment because the skewness turned larger, thereby causing the surface to become rougher. Upon observation of the slidably-movable part with regard to the respective embodiments, it was confirmed that PTFE had been transferred to the microscopic asperities as well as the depression, in the pit-like shape or the crater-like shape, on the surface. The transfer of PTFE can be confirmed from a contact angle, in a range of 100 to 110 degrees, shown upon water drops being dripped down. The microscopic asperities as well as the depression, in the pit-like shape or the crater-like shape, on the surface, cause the respective wearings 11, and 12 to wear in the initial stage to thereby hold the abrasion-powders thereof, thereby enhancing the wear resistance of the puffer cylinder 6 made of an aluminum alloy.

With Comparative Example 1, since the treatment time was too short, and the reduced valley depth Rvk at 0.9 μm was too small as compared with the other embodiments, a sufficient coat of the hydrated aluminum could not be made, so that the puffer cylinder was found worn, and the wearing as well was found worn by the agency of the abrasion-powders of aluminum.

With Comparative Example 2, the untreated aluminum, as well, was found worn more than that in the case of Comparative Example 1. The wearing as well was found worn.

Fifth Embodiment

With respect to the present embodiment, the treatment for forming hydrated aluminum on a puffer cylinder 6 was carried out by the same method as that in the case of the first embodiment, and for respective wearings 11, and 12, a PEEK (PolyEtherEtherKetone) resin was used. In the case of this combination, at the slidable-movement test, a remarkable wear was not observed in the puffer cylinder 6, wearings 11 and 12.

Sixth Embodiment

With respect to the present embodiment, the treatment for forming hydrated aluminum on a puffer cylinder 6 was carried out by the same method as that in the case of the first embodiment, and for respective wearings 11 and 12, a polyacetal resin was used. The slidable-movement test was conducted with this combination, a remarkable wear was not observed on the puffer cylinder 6 and wearings 11 and 12.

Thus, if hydrated aluminum is formed on the surface of pure aluminum or an aluminum alloy, the wear resistance of the puffer cylinder 6 was enhanced as compared with the case of using untreated aluminum, and under operation conditions of the puffer-type gas circuit breaker according to the invention, wear-resistance equivalent to that, in the respective cases of the alumite treatment and electroless Ni—P plating, was demonstrated, so that coat-forming, and liquid waste disposal can be executed with the use of simple facilities as compared with the case of using the alumite treatment, etc.

Seventh Embodiment

Figure 6:
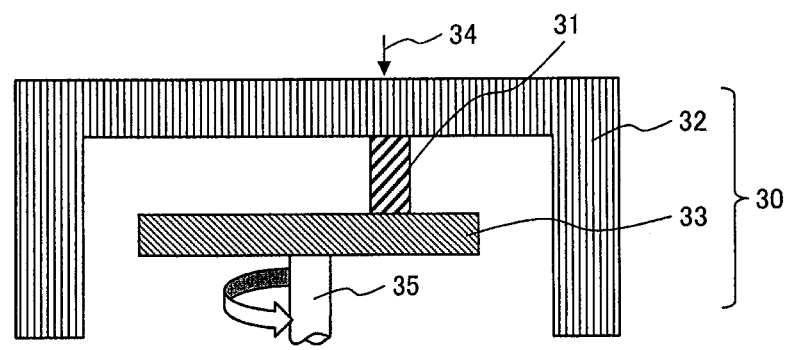
FIG. 6 is a schematic view showing a pin-on-disk type test for describing applicability of the invention to a wear-resistant material.

Next, in connection with applicability of the present invention to a wear-resistant material, other than the puffer cylinder, a pin-on-disk type test shown in FIG. 6 is described below.

As shown in the FIG. 6, an aluminum alloy with a hydrated aluminum film formed thereon was used as a disk test-piece 33 in a disk-like shape, and a wearing material having a diameter of 8 mm was used as a pin-shaped test-piece 31, and the disk test-piece 33 and the pin-piece 31 were installed in a test apparatus 30. A press-down load 34 was applied to a slidably-movable part through the intermediary of a cover 32 under test conditions that a rotational speed of the disk was set at 1 m/s.

As a result, abnormal wear was not observed with respect to both the disk test-piece 33 and the pin-shaped test-piece 31 even at 9 MPa of contact pressure. In other words, it can be said that the aluminum alloy having the hydrated aluminum film formed thereon has advantageous effects as the other wear-resistant material.

Eighth Embodiment

Figure 7:
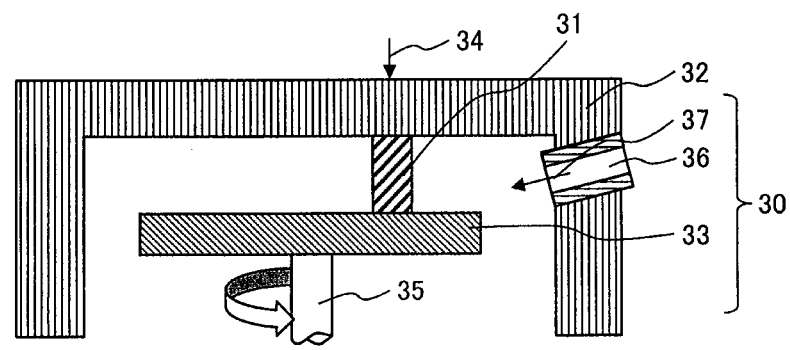
FIG. 7 is a schematic view showing a variation to the test of FIG. 6.

With respect to the present embodiment, a test was conducted with the use of the test apparatus according to the seventh embodiment, except that a through-hole 36 was provided in the vicinity of the slidably-movable part, and a nitrogen gas 37 was fed through the through-hole 36 at a rate of 10 L/min, as shown in FIG. 7. Otherwise, the present test was the same as the preceding test.

As a result, abnormal wear was not observed with respect to both the disk test-piece 33 and the pin-shaped test-piece 31 even in an inert gas at 9 MPa of the contact pressure.

Thus, it is evident that the aluminum with the hydrated aluminum film formed thereon has excellent wear resistance not only in the air but also in a nitrogen gas.

While the various embodiments of the invention have been described as above, it is to be understood that the invention be not limited thereto, and that variations thereto be included in the invention. For example, detailed explanation has been given about the respective embodiments described as above simply for the sake of clarity, and therefore, the invention is not necessarily limited to the respective embodiments having all configurations as described. Further, a part of the configuration of one of the embodiments described as above may be replaced with a part of the other embodiment. Still further, the configuration of the other embodiment may be added to the configuration of one of the embodiments. Furthermore, addition, deletion, or replacement by use of other configuration may be applied to a part of the configuration as to the respective embodiments.

REFERENCE SIGNS LIST

1 . . . stationary-side arc-contactor, 2 . . . movable-side arc-contactor, 3 . . . insulation nozzle, 4 . . . movable-side main contactor, 5 . . . movable-side arc-contactor, 6 . . . puffer cylinder, 7 . . . cylinder shaft, 8 . . . external current collector, 10 . . . piston, 11, 12 . . . wearing, 13 . . . puffer chamber, 14 . . . insulation-manipulation rod, 17 . . . whole of a puffer cylinder, 18 . . . link, 20 . . . projection, 21 . . . depression, 22 . . . hydrated aluminum coat, 30 . . . test apparatus, 31 . . . pin-shaped test-piece, 32 . . . cover, 33 . . . disk test-piece, 34 . . . press-down load, 36 . . . through-hole, 37 . . . nitrogen gas.

What is claimed is:
1. A wear-resistant material comprising:
a base material of pure aluminum or an aluminum alloy having a plurality of depressions randomly disposed on a surface thereof; and a hydrated oxide coat of aluminum formed on the surface of the base material, wherein each of the depressions has a depth of 1 μm or more and a diameter between 5 to 30 μm, and wherein the hydrated oxide coat includes a plurality of projections each having a length not more than 1 μm, and the hydrated oxide coat has a thickness of 1 μm to 3 μm.

2. The wear-resistant material according to claim 1, wherein the coat is obtained by a chemical conversion coating.

3. The wear-resistant material according to claim 1, wherein the wear-resistant material has surface roughness having a skewness (SK) of a negative value and a reduced valley depth (Rvk) of 1 μm or more.

4. A puffer cylinder formed of being linked with a movable-side arc-contactor which is arranged capable of contacting with and separating from a stationary-side arc-contactor, fitted with a piston inside thereof, and the piston slidably moving against the inner-wall surface of the puffer cylinder in order for the piston to suck in, or spurt an arc-extinguishable gas, the puffer cylinder comprising:

a base material of pure aluminum or an aluminum alloy which has a plurality of depressions randomly disposed on an inner-wall surface thereof; and a hydrated oxide coat of aluminum formed on the inner-wall surface of the base material, wherein each of the depressions has a depth of 1 μm or more and a diameter between 5 to 30 μm, and wherein the hydrated oxide coat includes a plurality of protections each having a length not more than 1 μm, and the hydrated oxide coat has a thickness of 1 μm to 3 μm.

5. The puffer cylinder according to claim 4, wherein the coat is obtained by a chemical conversion coating.

6. The puffer cylinder according to claim 4, wherein the inner-wall surface of the puffer cylinder has surface roughness having a skewness (Sk) of a negative value and a reduced valley depth (Rvk) of 1 μm or more.

7. The puffer cylinder according to claim 4, wherein a wearing is provided on the outer periphery of the piston, and the wearing slidably moves against the inner-wall surface of the puffer cylinder.

8. The puffer cylinder according to claim 6, wherein a wearing is provided on the outer periphery of the piston, and the wearing slidably moves against the inner-wall surface of the puffer cylinder.

9. The puffer cylinder according to claim 4, wherein the hydrated oxide coat of aluminum obtained by the chemical conversion coating is formed throughout the whole of the puffer cylinder.

10. The puffer cylinder according to claim 6, wherein the hydrated oxide coat of aluminum obtained by the chemical conversion coating is formed throughout the whole of the puffer cylinder.

11. The puffer cylinder according to claim 7, wherein the hydrated oxide coat of aluminum obtained by the chemical conversion coating is formed throughout the whole of the puffer cylinder.

12. A puffer-type gas circuit breaker comprising:

a stationary-side arc-contactor;

a movable-side arc-contactor which moves to contact with and separate from the stationary-side arc-contactor;

a puffer cylinder as recited in claim 4 which is linked with the movable-side arc-contactor;

a piston for sucking in or spurting the arc-extinguishable gas while making a relative movement against the inner-wall surface of the puffer cylinder; and the puffer-type gas circuit breaker being configured such that the arc-extinguishable gas that is spurted as a result of the movement made by the piston is sprayed to an arc caused by the separation of the stationary contactor and the movable contactor to thereby extinguish the arc.

13. A puffer-type gas circuit breaker comprising:

a stationary-side arc-contactor;

a movable-side arc-contactor which moves to contact with and separate from the stationary-side arc-contactor;

a puffer cylinder as recited in claim 6 which is linked with the movable-side arc-contactor;

a piston for sucking in or spurting the arc-extinguishable gas while making a relative movement against the inner-wall surface of the puffer cylinder; and the puffer-type gas circuit breaker being configured such that the arc-extinguishable gas that is spurted as a result of the movement made by the piston is sprayed to an arc caused by the separation of the stationary contactor and the movable contactor to thereby extinguish the arc.

14. A puffer-type gas circuit breaker comprising:

a stationary-side arc-contactor;

a movable-side arc-contactor which moves to contact with and separate from the stationary-side arc-contactor;

a puffer cylinder as recited in claim 7 which is linked with the movable-side arc-contactor;

a piston for sucking in or spurting the arc-extinguishable gas while making a relative movement against the inner-wall surface of the puffer cylinder; and the puffer-type gas circuit breaker being configured such that the arc-extinguishable gas that is spurted as a result of the movement made by the piston is sprayed to an arc caused by the separation of the stationary contactor and the movable contactor to thereby extinguish the arc.

15. A puffer-type gas circuit breaker comprising:

a stationary-side arc-contactor;

a movable-side arc-contactor which moves to contact with and separate from the stationary-side arc-contactor;

a puffer cylinder as recited in claim 9 which is linked with the movable-side arc-contactor;

a piston for sucking in or spurting the arc-extinguishable gas while making a relative movement against the inner-wall surface of the puffer cylinder; and the puffer-type gas circuit breaker being configured such that the arc-extinguishable gas that is spurted as a result of the movement made by the piston is sprayed to an arc caused by the separation of the stationary contactor and the movable contactor to thereby extinguish the arc.

16. The wear-resistant material according to claim 1, wherein the hydrated oxide coat includes boehmite and bayerite.

17. The wear-resistant material according to claim 4, wherein the hydrated oxide coat includes boehmite and bayerite.

* * * * *